(12) United States Patent
Spanevello (10) Patent No.: US 11,435,250 B2
(45) Date of Patent: Sep. 6, 2022

(54) DEVICE FOR MEASURING A PHYSICAL PARAMETER OF A FLUID OF A MOTOR VEHICLE CIRCUIT

(71) Applicant: AKWEL SA, Champfromier (FR)

(72) Inventor: Marco Martino Spanevello, Venasque (FR)

(73) Assignee: AKWEL, Champfromier (FR)

( * ) Notice: Subject to any disclaimer, the term of this patent is extended or adjusted under 35 U.S.C. 154(b) by 283 days.

(21) Appl. No.: 16/220,839

(22) Filed: Dec. 14, 2018

(65) Prior Publication Data

US 2019/0187017 A1    Jun. 20, 2019

(30) Foreign Application Priority Data

Dec. 14, 2017    (FR) ..................... 17/01304

(51) Int. Cl.
| | |
|---|---|
| *G01L 19/00* | (2006.01) |
| *G01K 1/14* | (2021.01) |
| *B60R 16/08* | (2006.01) |
| *G01L 9/00* | (2006.01) |
| *G01K 1/08* | (2021.01) |

(Continued)

(52) U.S. Cl.
CPC .......... *G01L 19/0092* (2013.01); *B60R 16/08* (2013.01); *G01D 11/245* (2013.01); *G01K 1/08* (2013.01); *G01K 1/14* (2013.01); *G01K 13/02* (2013.01); *G01L 9/0051* (2013.01); *G01L 19/0069* (2013.01); *G01L 19/142* (2013.01); *G01K 2205/00* (2013.01)

(58) Field of Classification Search
CPC . G01L 19/0092; G01L 19/142; G01L 9/0051; G01L 19/0069; G01L 9/0016; G01K 1/08; G01K 13/02; G01K 1/14; G01K 2205/00; G01D 11/245; B60R 16/08
See application file for complete search history.

(56) References Cited

U.S. PATENT DOCUMENTS

| | | | | |
|---|---|---|---|---|
| 5,315,877 A | * | 5/1994 | Park ...................... | G01L 9/0075 73/718 |
| 6,176,137 B1 | * | 1/2001 | Sasaki ................. | G01L 19/0084 73/754 |

(Continued)

FOREIGN PATENT DOCUMENTS

| | | |
|---|---|---|
| DE | 102006045924 A1 | 4/2008 |
| EP | 0949494 A2 | 10/1999 |

(Continued)

*Primary Examiner* — Xin Y Zhong
(74) *Attorney, Agent, or Firm* — Oliff PLC (57) ABSTRACT

The device comprises a case body comprising a base body provided with a chamber for measuring the fluid and an electrical connector body, assembled to delimit together a housing internal to the case body, a detection element, an intermediate part for positioning the detection element including a transverse space for receiving the detection element and an environment gasket for sealing the internal housing with respect to the external environment. The part and the connector are shaped to cooperate by nesting in order to ensure a relative positioning of the part relative to the connector body and in a nested position, the part and the connector delimit together an external peripheral groove configured to receive the environment gasket.

14 Claims, 7 Drawing Sheets

(51) Int. Cl.
*G01D 11/24* (2006.01)
*G01K 13/02* (2021.01)
*G01L 19/14* (2006.01)

(56) References Cited

U.S. PATENT DOCUMENTS 6,487,911 B1 * 12/2002 Frackelton ............ G01L 9/0075
73/714
2016/0252418 A1   9/2016 Uiterkamp et al.

FOREIGN PATENT DOCUMENTS

| EP | 1505380 A2 | 2/2005 |
| JP | 2000-105163 A | 4/2000 |
| WO | 2008/031691 A1 | 3/2008 |

* cited by examiner

DEVICE FOR MEASURING A PHYSICAL PARAMETER OF A FLUID OF A MOTOR VEHICLE CIRCUIT

The present invention relates to a device for measuring a physical parameter of a fluid, such as a fluid circulating in a circuit of a motor vehicle. It applies more particularly but not exclusively to the measurement of the pressure or the temperature of the fluid circulating in such circuits or else to the measurement of the humidity residing in these circuits.

Such a measuring device is particularly configured to be integrated in different circuits of the motor vehicle such as braking assist circuits, vacuum circuits for driving the auxiliaries, fuel circuits, fuel vapor and/or oil vapor circuits, cooling circuits, pollution control fluid circuits (urea solution, particle filter additives), etc.

In general, as it is known in particular from the document U.S. 2016/0252418, the device comprises a case body comprising a first portion forming a base and a second portion forming a connector. The two portions are assembled together to form a sealed volume inside which a detection element extends.

In order to ensure tightness to the external environment of the device (essentially dust and humidity), the device further comprises a sealing gasket configured to extend between the connector body and the base body. Furthermore, in order to facilitate its indexing inside the internal volume of the case body, the detection element has a hexagonal shape like the base and the connector. The device further comprises a clip support ring fastened by welding inside the base body delimiting a hexagonal receiving space of the detection element and a clip for holding the element in this space.

The drawback of the device of the prior art is that it requires, in order to achieve the indexing, the use of a hexagonal specific shape of the different elements composing it, including the detection element. This contributes to the complexity of this device and of course, the significant costs associated with this very particular arrangement. Moreover, since the sealing to the environment is made by compression of the hexagonal shaped gasket between the base and the connector, this imposes providing an assembly of the base and the connector allowing such a compression and therefore significant stresses at the level of the chain of edges.

In particular, the object of the invention is to provide a device for measuring a physical parameter of a motor vehicle fluid which is simple to design and manufacture, robust and which has an excellent reliability in terms of sealing.

To this end, the object of the invention is a device for measuring a physical parameter of a fluid, in particular a fluid of a circuit of a motor vehicle, of the type comprising:
- a case body comprising a base body provided with a chamber for measuring the fluid and a connector body for the electrical coupling of the device with an external electrical circuit, the connector and base bodies being assembled to delimit together a housing internal to the case body,
- an element for detecting the physical parameter delimiting a first face communicating with the measuring chamber and a second face for electrical connection with the connector body,
- an intermediate part for positioning the detection element comprising a transverse space for receiving the detection element, and
- an environment gasket arranged to ensure sealing of the internal housing with respect to the external environment, wherein the intermediate part and the connector body are shaped to cooperate by nesting in order to ensure a relative positioning of the part relative to the connector body and in that in a nested position, the part and the body delimit together an external peripheral groove configured to receive the environment gasket.

Thanks to the particular geometry of the intermediate part and the connector, the relative positioning of the detection element with the connector body is simplified. Furthermore, the formation of the peripheral groove for housing the environment gasket during the assembly of the connector and the part allows creating an optimal and simple sealing without resorting to subsequent sealing operations by deposition of resin or other materials. Since the groove is formed outside the assembly of the connector and the part in a junction area of the two components, this allows ensuring sealing in an area which is particularly sensitive to humidity and dust intrusions.

Preferably, the external peripheral groove has a radially outwardly open U-shaped cross-section. For example, the external peripheral groove is closed by the base body such that the environment gasket is compressed radially inside the groove, in the assembly position of the device.

In a preferred embodiment of the invention, the connector body and the intermediate part comprise nesting members with a complementary shape formed, on faces opposite the intermediate part and the connector body, by a succession of protruding and recessed portions offset relative to those of the opposite face.

Preferably, the nesting members of the intermediate part are disposed around the receiving space of the detection element.

In the described example, the connector body comprises a front wall for closing the base body and a peripheral lateral skirt extending from an inner face of the front wall by forming an internal shoulder with the wall, the skirt and the shoulder delimiting respectively a bottom and a lateral wall of the groove.

In the preferred embodiment of the invention, the intermediate part has a plate-like general shape provided with a raised peripheral flange with respect to the plane of the plate, this peripheral edge delimits a central portion inside which the transverse receiving space extends.

Preferably, in the mounting position, the raised peripheral flange of the intermediate part bears against the internal shoulder via the gasket.

In a preferred embodiment of the invention, the lateral skirt is sized so as to extend at least partially inside the peripheral flange of the intermediate part.

Preferably, the detection element comprises a wafer-like shaped support, the thickness of the central portion of the intermediate part substantially corresponds to the thickness of the wafer.

In a preferred embodiment of the invention, the connector body comprises an electrical coupling endpiece extending axially in protrusion.

Preferably, the intermediate part is forcibly mounted inside the base body or is integral with the base body.

Preferably, the intermediate part comprises on a peripheral outer wall of its raised edge at least one rib capable of cooperating by friction with a lateral inner wall of the base body to create the forced mounting inside the base body.

In a preferred embodiment of the invention, the base body is provided with a peripheral lateral wall retaining the connector body by crimping an end edge of the lateral wall on the external periphery of the connector body.

In a preferred embodiment of the invention, the detection element has a rectangular, square or cylindrical general shape.

Preferably, the intermediate part is made of a thermoplastic material.

In a preferred embodiment of the invention, the intermediate part further comprises an axial extension in the form of an immersion sleeve to house a temperature probe. Preferably, the immersion sleeve extends on the border of the internal receiving space of the detection element.

Preferably the device comprises at least one other sealing gasket to the fluid circulating in the measuring chamber, the base body comprising a bottom provided with an opening for communicating with a chamber, in which the bottom has a location for receiving the fluid sealing gasket delimited by a step.

Other features and advantages of the invention will emerge in light of the following description, made with reference to the appended drawings in which.

Figure 1:
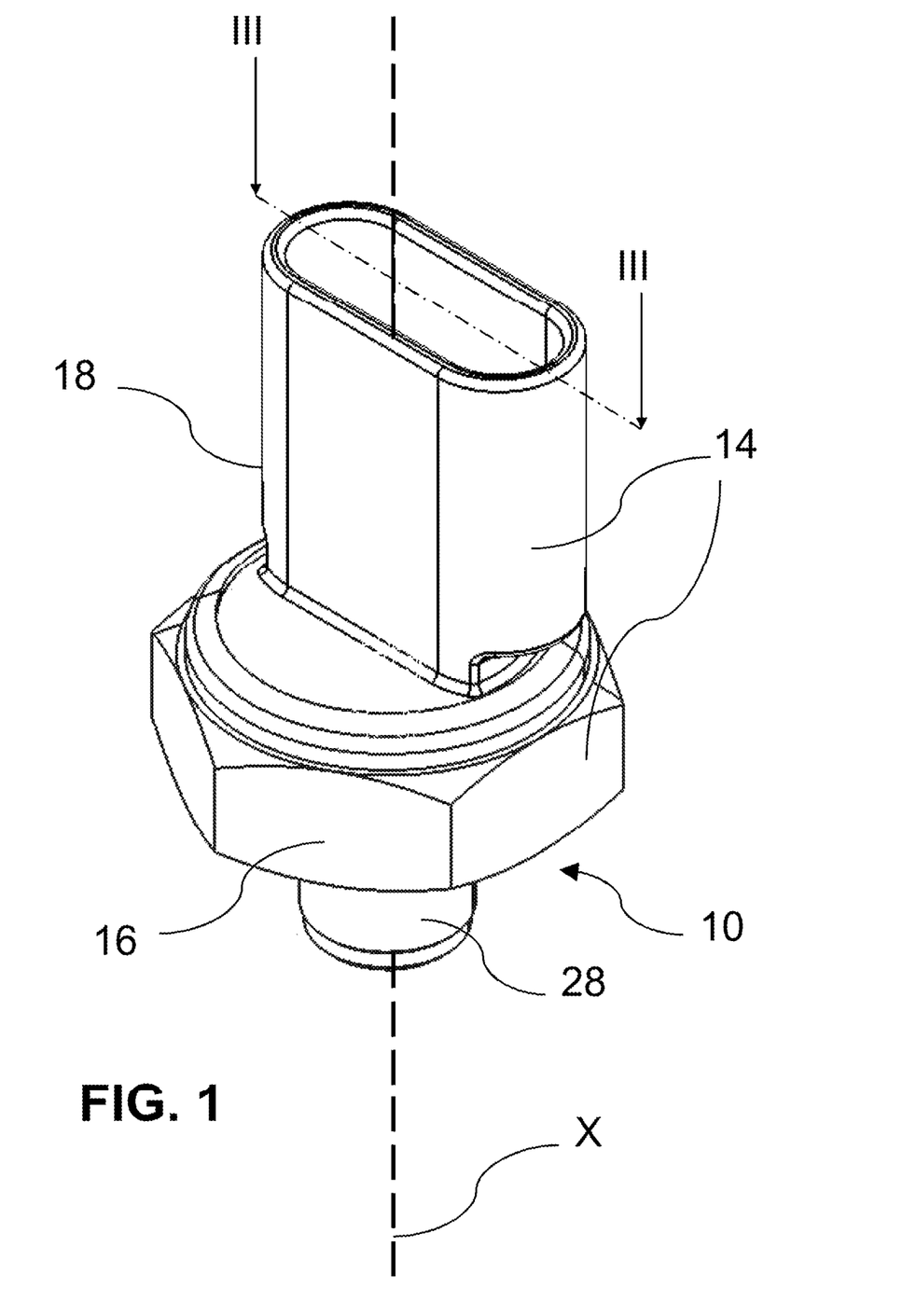
FIG. 1 represents a perspective view of a measuring device according to the invention.

In FIG. 1, a device for measuring a physical parameter of a fluid is schematically represented. This device is subsequently designated by the general reference 10. This device is configured more particularly but not exclusively for measuring a physical parameter of a fluid of a motor vehicle circuit. Preferably and throughout the remainder of the description, the measuring device 10 is configured to measure at least one pressure parameter of the fluid and preferably in addition to a temperature parameter.

Figure 2:
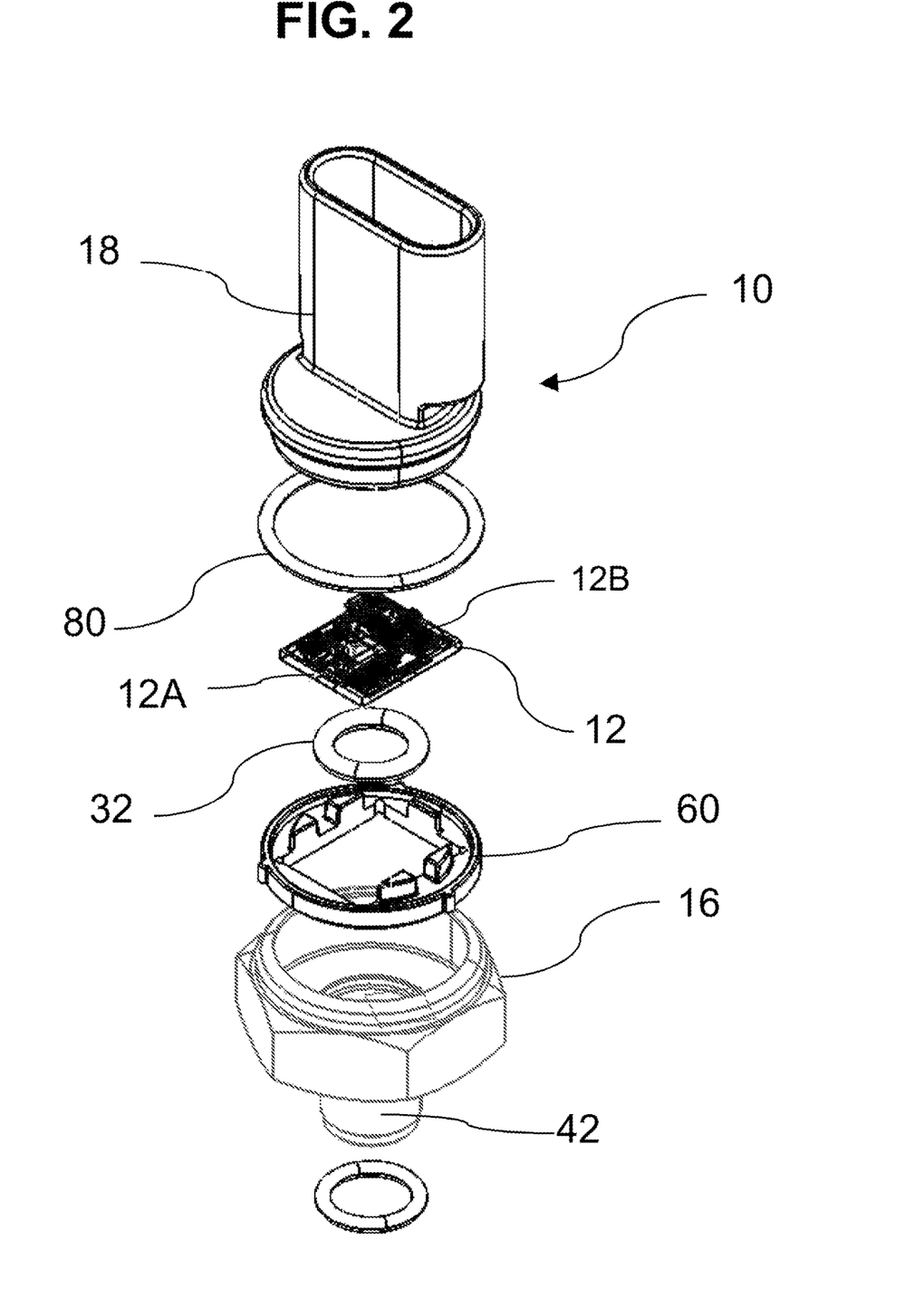
FIG. 2 is an exploded view of the measuring device of FIG. 1.

To this end, the device 10 comprises an element 12 for detecting the physical parameter. This element 12 comprises a support, for example a wafer-like shaped support with a rectangular general shape as represented in FIG. 2. This element 12 delimits a first detection face 12A comprising a sensitive surface configured to be in contact with the fluid and a second electrical connection face 12B for the electrical coupling thereof to an external electrical circuit (not represented). Furthermore, the detection element 12 may include a pressure sensor and also a temperature sensor.

In this example, the element 12 moreover comprises, on the electrical connection face 12B, an electronic component 11, for example an ASIC type component (acronym for «Application-Specific Integrated Circuit»). In this case, the wafer of the element 12 may be made for example of ceramic, consisting essentially of alumina for example, and the component 11 may be attached by screen-printing on the wafer or by welding or brazing or else by a combination of these techniques. This wafer may in this case incorporate a deformable membrane associated to a piezo-resistive material arranged according to a Wheatstone bridge architecture. In a manner known per se, a deformation of the membrane causes a resistance variation and therefore a voltage variation. This voltage variation is related to the pressure exerted on the membrane by a predefined correlation law.

Figure 6:
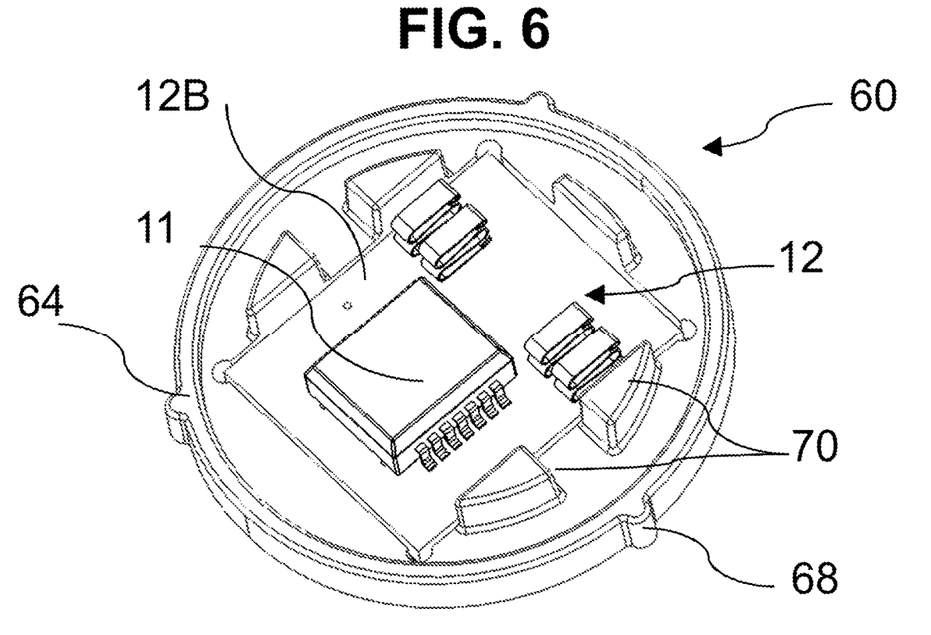
FIG. 6 is a perspective view of the assembly comprising the intermediate part of FIG. 5 and an element for detecting the physical parameter for the measurement of the parameter by the device of FIG. 1.
Figure 7:
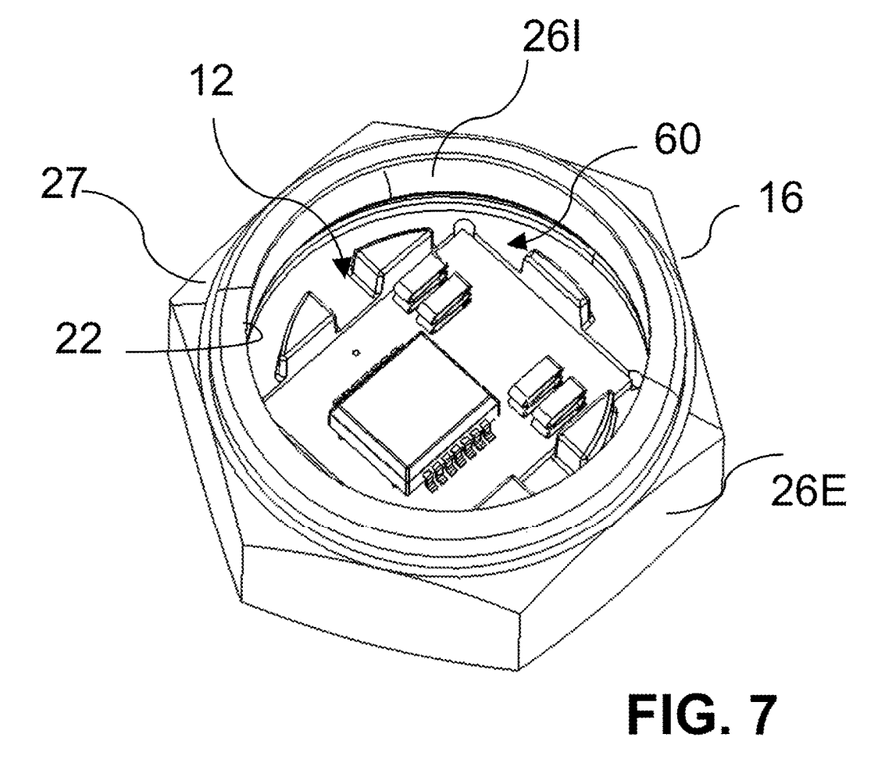
FIG. 7 represents a perspective view of the assembly shown in FIG. 6 mounted inside the case body portion illustrated in FIG. 5.

Alternatively, the element 12 may include a chip of a micro electro mechanical system (MEMS) for example provided with a sensitive membrane and a stress detection circuit allowing measuring the compression state of the membrane which is proportional to the fluid pressure (FIGS. 6 and 7). In this case, the wafer may also consist of a conventional printed circuit board known per se commonly designated by the acronym PCB for «printed circuit board».

In a variant which is not illustrated, the detection element 12 may optionally include a foolproof profile to ensure a proper electrical connectivity of the electrical connection face thereof. For example, the detection element may have a square or rectangular general shape and have a broken corner for foolproof or else be cylindrical shaped and have reliefs or locating marks.

Figure 3A:
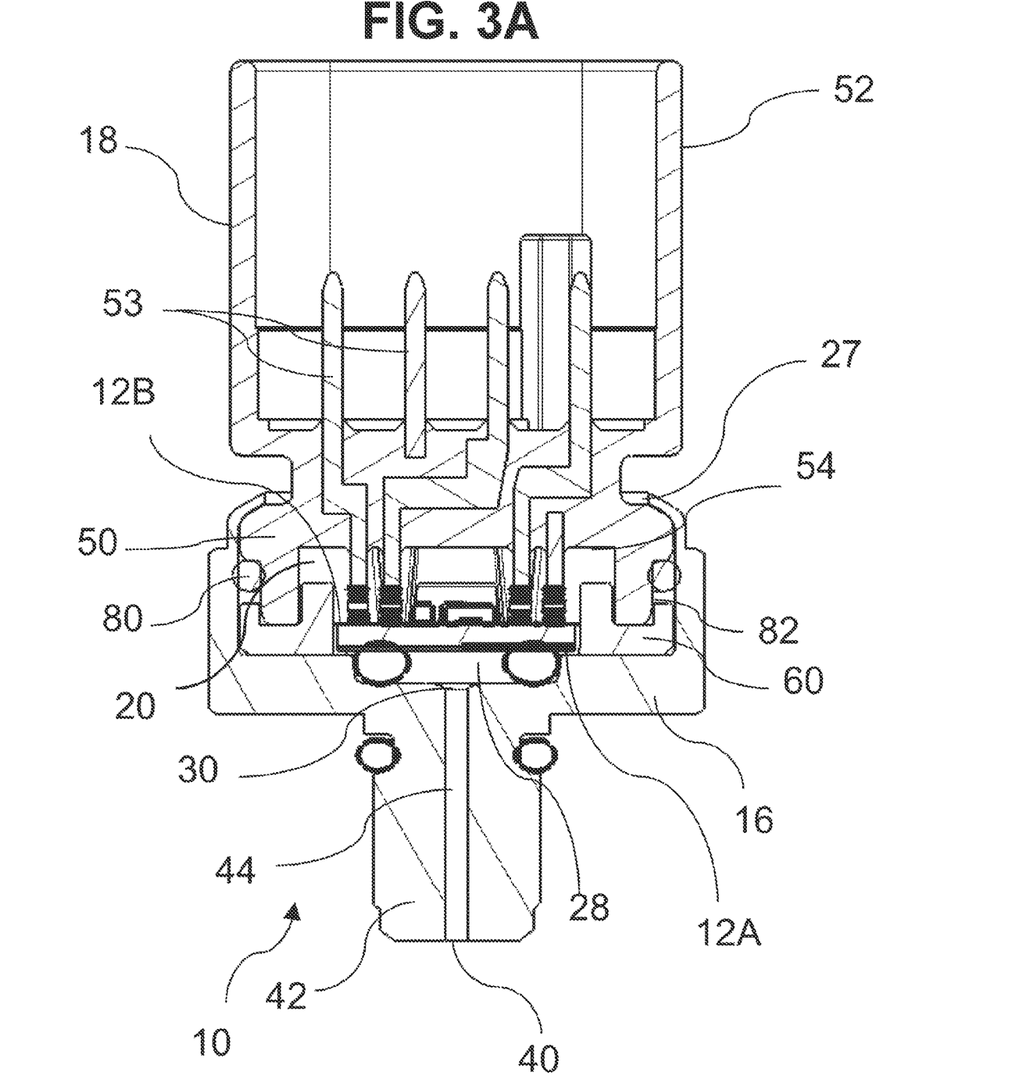
FIG. 3A is a sectional view of the measuring device of FIG. 1 along the line III-III of FIG. 1.

As represented in FIG. 1, the device 10 further comprises a case body 14. This body 14 comprises a lower portion 16, hereinafter designated by a base body or base and an upper portion 18 hereinafter designated by a connector body or connector. The connector 18 and base 16 bodies are assembled to delimit together an internal volume of the case body 14 forming an inner housing 20 for the detection element 12 shown in FIG. 3.

Figure 5:
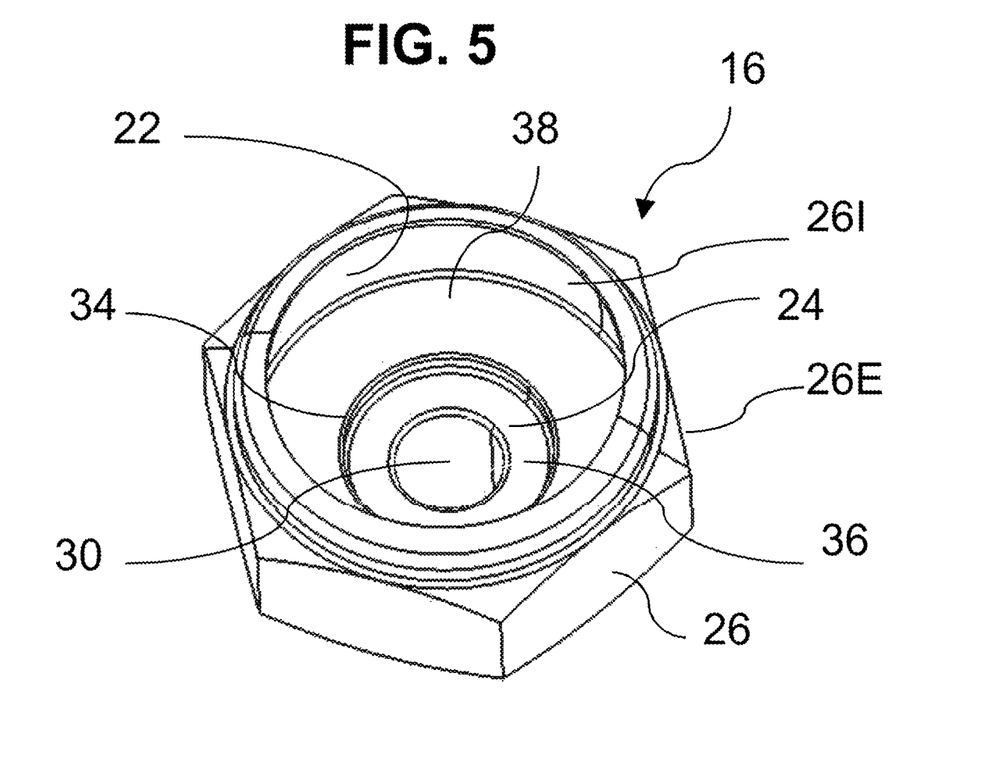
FIG. 5 represents a perspective view of a portion of the case body of the measuring device of FIG. 1.

As illustrated in FIG. 5, the base 16 preferably comprises a body having mainly a general shape of revolution about a main axis X of the device 10 or a symmetrical shape. The base 16 has in this example an open cavity 22 delimited by a bottom 24 and a peripheral wall 26. The cavity 22 has in this example a general shape of revolution about the axis X. The peripheral wall 26 has in this example an external surface 26E having a hexagonal profile and an internal surface 26I having a circular profile. Of course, this is not limiting and other profiles may be suitable for carrying out the invention.

Preferably, the base 16 is further provided with a fluid measuring chamber 28 shown in FIG. 3. This chamber 28 is configured to communicate, on the one hand, with a fluid passage area in the fluid circulation circuit (not represented) and, on the other hand, with the internal housing 20 of the case body 14 inside which the detection element 12 extends.

Thus, as represented in section in FIG. 5, the bottom 24 of the cavity 22 of the base 16 comprises an orifice 30 for communicating with the measuring chamber 28. Thus, the sensitive surface of the detection element 12 may be in communication with the measuring chamber 28 while being housed inside the case body 14 (FIG. 3).

In order to prevent the penetration of the fluid into the internal housing 20 of the case body 14, the device 10 further comprises a sealing gasket 32 to the fluid circulating in the measuring chamber 28.

To this end, as shown in the sectional view of FIG. 3 as well as in FIG. 5, the bottom 24 of the cavity 22 has a step 34 in order to delimit a central area 36 and a raised peripheral area 38. The communication orifice 30 preferably extends inside the central area 36. The central area 36 and the step 34 delimit a location for the fluid sealing gasket 32. The gasket 32 has in this example a toroidal general shape and the bottom 24 has a shape of revolution about the main axis X of the device 10 and the central area 36 is sized so as to receive the gasket 32.

In this example, the measuring chamber 28 is formed by an axial extension endpiece 42 and crossed by at least one bore 44 opening at a first end through the orifice 30 inside the cavity 22 and at a second end through an orifice 40 opening to the outside of the device 10. This endpiece 42 may possibly have on its external surface a threading to enable a screwed use of the device 10 and, as illustrated in FIG. 3, a housing for receiving an O-ring sealing gasket external to the device 10.

Possibly, when this endpiece is made of plastic material, for example by injection molding, then the housing for the O-ring gasket forming for example a groove in the endpiece, may be made in a particularly advantageous manner, without any molding burr in the groove, according to the method which was the subject of a patent application in France by the applicant under the No. 17.55615.

The base 16 is for example made of a metal material and may be made by simple machining because of its general shape of revolution.

Figure 8:
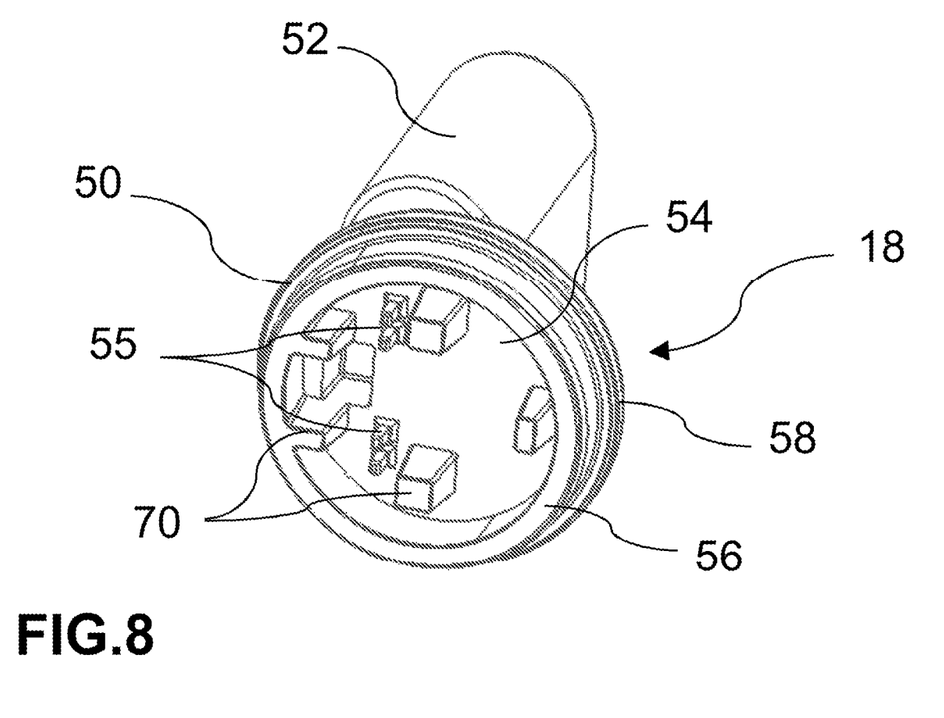
FIG. 8 represents a perspective bottom view of another portion of the case body of the measuring device of FIG. 1.

The connector 18 is represented in detail in FIGS. 3 and 8. The connector 18 is shaped to allow the electrical coupling of the device 10 with an external electrical circuit such as, for example, an electrical control unit of the motor vehicle (not represented).

The connector 18 comprises a main portion 50. The main portion 50 preferably has a substantially general shape of revolution. This main portion 50 forms in the described example a cover to close the cavity 22 of the base 16 and thus delimit the internal housing 20 of the device 10. In this example, the internal volume of the case body 14 generally has a general shape of revolution about the axis X.

Preferably, the connector 18 further comprises an endpiece 52 for electrical coupling with an external circuit extending axially in protrusion from the main portion 50. To this end and as illustrated in FIG. 3, the connector 18 also comprises a plurality of electrical connection pins 53 extending inside the endpiece 52 so as to form a socket.

Furthermore, as illustrated in FIG. 8, the connector 18 comprises a front wall 54 for closing the base 16 which is configured to face the cavity 22 formed by the base 16. This front wall 54 faces the base 16 such that when the base 16 and the connector 18 are joined, the front wall 54 closes the internal volume of the case body 14 to delimit the internal housing 20.

It is in particular shown in FIG. 3 and in FIG. 6 that the second electrical connection face 12B of the detection element 12 is configured to come into contact with electrical elements 55 of the connector 18 linked to the pins 53 described above. Of course, this configuration is in no way limiting and other configurations may be suitable for carrying out the invention.

Preferably, the connector 18 comprises an internal peripheral lateral skirt 56 forming with the front wall 54 for closing an internal shoulder 58. In the mounting position, the skirt 56 extends substantially axially in the direction of the base 16 of the device 10 inside the cavity 22 of the base 16.

The inner face of the front wall 54 may be planar or locally have reliefs. For example, as illustrated in particular in FIG. 3, the inner face of the front wall 54 has an overthickness on the periphery thereof, which forms in the present case the shoulder 58.

In order to assemble the base 16 and the connector 18, the peripheral wall 26 of the base 16 is preferably also provided with an end edge 27 retaining the connector 18 by crimping the end edge on the external periphery of the connector 18. To this end, the peripheral wall 26 comprises a thinned portion forming the end edge 27 configured to be crimped.

Figure 4:
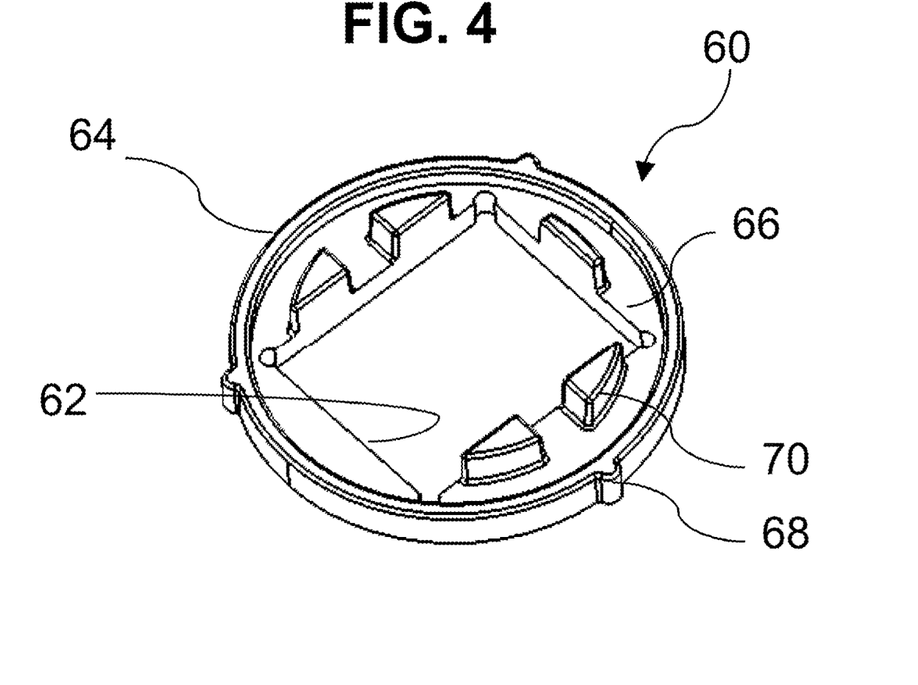
FIG. 4 is a perspective view of an intermediate part of the measuring device of FIGS. 1 to 3.

In accordance with the invention, in order to position the detection element 12 inside the inner housing 20, the device 10 also comprises an intermediate part 60 for positioning the detection element 12, illustrated in detail in FIG. 4. This intermediate part 60 comprises in particular a transverse space 62 for receiving the detection element 12 so as to form the assembly illustrated in FIG. 6. This part 60 is preferably configured to be housed inside the cavity 22 of the base 16 as represented in FIG. 7.

For example, the transverse space 62 has a general shape complementary to that of the detection element 12, for example in the present case, the transverse space 62 has a rectangular general shape. Of course, other forms of detection element are adapted for carrying out the invention and consequently other forms of transverse receiving space. In particular, in the case where the detection element comprises a foolproof profile, the transverse space 62 comprises a complementary internal profile.

In the described example, the intermediate part 60 has a plate-like general shape provided with a raised peripheral flange 64 with respect to the plane of the plate. This peripheral flange 64 delimits a central portion 66 inside which the transverse receiving space 62 extends.

Preferably, the thickness of the central portion 66 of the intermediate part 60 substantially corresponds to the thickness of the printed circuit wafer of the element 12.

In accordance with the invention, in order to ensure an accurate relative positioning of the detection element 12 with the connector 18, the intermediate part 60 and the connector 18 are shaped to cooperate by nesting.

Figure 9:
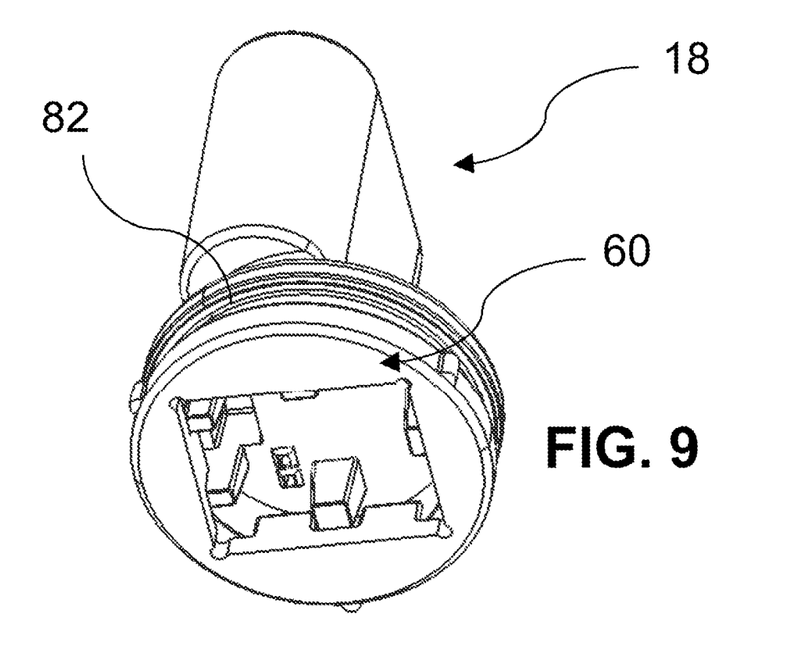
FIG. 9 represents a perspective bottom view of the case body mounted with the intermediate part shown in FIG. 4.

For example, as illustrated in FIGS. 4, 8 and 9, the connector 18 and the intermediate part 60 comprise nesting members 70 with complementary shapes formed, on faces opposite the intermediate part 60 and the connector 18, by a succession of protruding and recessed portions offset relative to those of the opposite face.

Of course, alternatively, the nesting of the intermediate part 60 and the connector 18 may be made in different manners for example by clipping, snap-fitting means or other.

Thus, preferably, the intermediate part 60 and the connector 18 have complementary shapes mechanically cooperating to ensure a releasable assembly of the intermediate part 60 and the connector 18.

Preferably and as illustrated in FIG. 4, the nesting members 70 of the intermediate part 60 are disposed around the receiving space 62. Moreover, preferably, the nesting members 70 of the connector 18 are disposed inside a space delimited by the lateral skirt 56 (FIG. 8). Furthermore, in FIG. 8, it is shown that some nesting members 70 are formed in one piece with the lateral skirt 56.

In order to ensure sealing of the device 10 to the environment (dust and especially humidity), the device 10 also comprises a sealing gasket 80 called environment gasket arranged such that it allows ensuring sealing of the internal volume of the case body 14 with respect to the external environment. This sealing gasket 80 has in this example a toroidal general shape. The sealing gasket 80 may be manufactured from any elastomeric material such as the thermoplastic elastomer, natural or synthetic rubber.

In accordance with the invention, once nested, the part 60 and the connector 18 delimit together an external peripheral groove 82 configured to receive the environment sealing gasket 80 as shown in FIGS. 3 and 9.

Figure 3B:
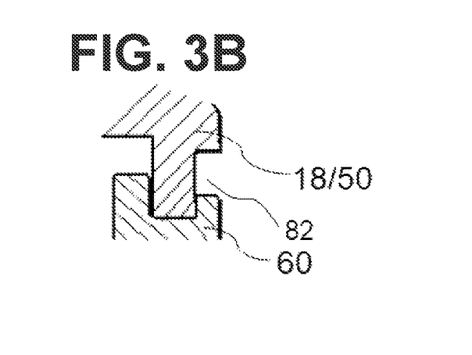
FIG. 3B is an exploded view of a portion of the sectional view of FIG. 3A.

As illustrated in FIG. 3B, preferably, the peripheral groove 82 has, in cross section, a U-shape whose opening is turned radially outwardly of the device 10. The groove 82 is preferably sized so that, in a mounting position of the device, the environment O-ring gasket 80 is compressed radially inside the groove 82 between the internal wall of the base 16 and the peripheral lateral skirt.

As is illustrated in the figures, the groove 82 is delimited by a bottom formed by the lateral skirt 56 and lateral walls formed, on the one hand, by the shoulder 58 and, on the other hand, by an end face of the flange of the intermediate part 60. When the device 10 is mounted as in FIG. 3, the closure wall extends through the device 10 whereas the lateral skirt 56 is, on its external end periphery pressed against the internal face of the flange of the intermediate part 60. The lateral skirt 56 also preferably has a free end provided with an end face configured to abut against the bottom of the intermediate part 60.

Preferably and as illustrated, the groove 82 is annular in order to achieve sealing by a gasket with a toroidal general shape. When the lateral skirt 56 abuts against the bottom of the intermediate part 60, the shoulder 58 and the end face of the flange of the intermediate part 60 are axially distant in order to define a width of the groove 82 in the axial direction sufficient to house the gasket 80.

In order to make this groove 82, in the mounting position, in the described example, the raised peripheral flange 64 of the intermediate part 60 is opposite the internal shoulder 58 of the connector 18 and the lateral skirt 56 extends at least partially on the internal side of the peripheral flange 64 of the intermediate part 60.

In the illustrated example, the compression of the environment gasket 80 is essentially radial. Alternatively, the compression of the environment gasket may also include an axial component between the two lateral walls of the groove 82.

In the preferred embodiment of the invention, the intermediate part 60 is forcibly mounted inside the base 16. To this end and in order to increase the contact pressure of the forced mounting, the intermediate part 60 comprises on the peripheral outer wall of its raised flange at least one rib 68 capable of cooperating by friction with the peripheral inner surface 26l of the base 16 during its assembly.

In a variant not illustrated in the figures, the intermediate part 60 may be integral with the base 16 provided of course that the base 16 is made of a material allowing it such as a plastic material or an aluminum alloy. Of course, in this case, only the relief of the upper face of the intermediate part is maintained in order to maintain the nesting and positioning functions of the detection element and the lower face is integral with the base. This has the advantage of reducing the number of components of the device 10 and simplifying the assembly method.

The intermediate part 60 is preferably made of plastic material, for example of a thermoplastic material. This allows ensuring an excellent electrical insulation and therefore an optimal protection of the printed circuit to electrostatic discharges. For example, the plastic material may include one or more of the following compounds: polyamides (of the PA6, PA6.6, PA4.6 type, etc.) and the high temperature declinations thereof (PPA), polyimides (PAI, PEI), polybutylene terephthalate (PBT), phenylenes (PPE, PPS), polysulphone (PSU), technopolymers (PEEK, PAEK), thermosetting polymers (unsaturated polyesters UP, Bakelite). The material may or may not be loaded for example with glass fibers, carbon fibers, glass beads, nanofillers. This allows in particular adapting the characteristics to each application (high temperature resistance, dimensional stability, thermal conductivity and/or electrical insulation).

This part 60 may advantageously be made in a very simple manner, for example by injection with a simple-closed mold.

The material of the intermediate part 60 may further include one or several additive(s) having properties for improving the thermal conductivity of the part, which thus allow increasing the accuracy and the temperature response time of the sensor while keeping the same performance in terms of electrical insulation.

Figure 11:
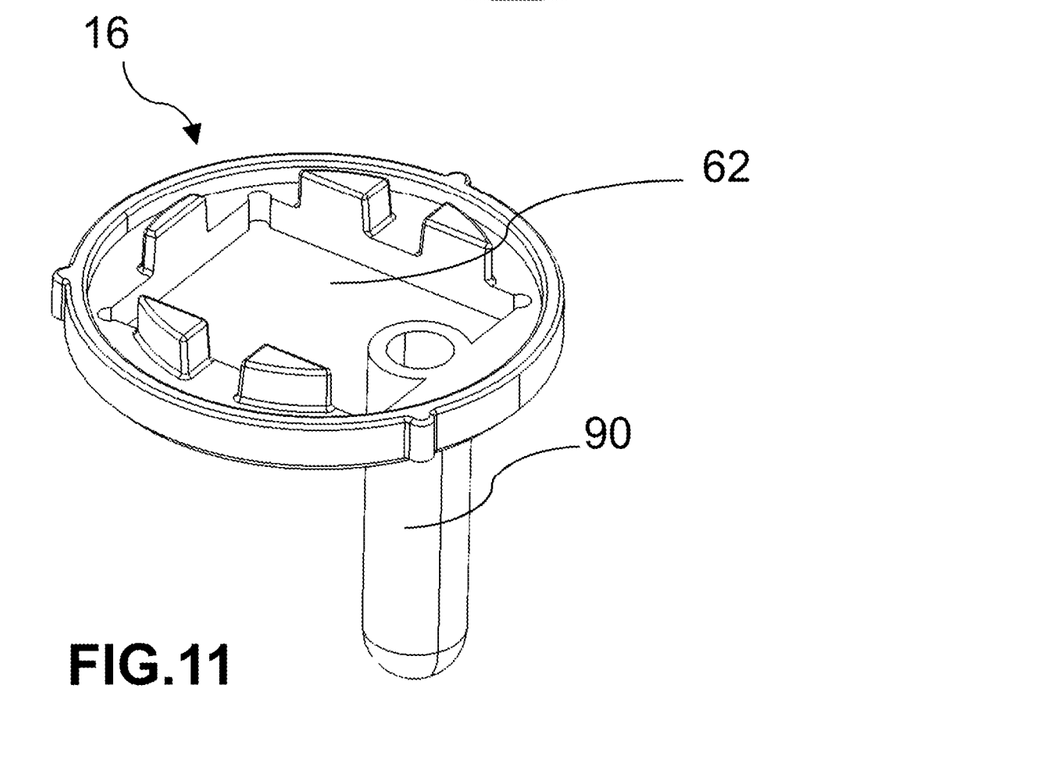
FIG. 11 is a perspective view of the intermediate part of FIG. 4 according to a variant of the invention.

In another embodiment of the invention illustrated in FIG. 11, the intermediate part 60 comprises an axial extension 90 in the form of an immersion sleeve to house a temperature probe. Preferably, the immersion sleeve 90 extends on the border of the internal receiving space 62 of the detection element 12. This allows offsetting the temperature probe of the detection element 12 and thus in particular increasing the sensitivity to thermal variations of the fluid. In this case, it is preferable to use a wired temperature probe instead of a temperature probe embedded directly on the printed circuit PCB or on the ceramic. In a manner known per se, the legs of the probe extend inside the immersion sleeve 90 and the sensitive end of the legs of the probe is then immersed inside the immersion sleeve. The accuracy and the response time of the temperature measurement are then improved.

The temperature probe comprises, for example, a NTC probe (acronym for Negative Temperature Coefficient). Alternatively, the probe may also be a PT100 type probe. Such a probe is constituted by a platinum filament surrounding a glass rod or not whose characteristic is to change the resistance depending on the temperature. In order to further improve the performances of the temperature probe, the immersion sleeve may be filled with a thermal paste in order to conduct the heat of the fluid more efficiently towards the sensitive part of the temperature probe.

Although this is not illustrated in the figures, it will be understood that in the case of an intermediate part provided with an immersion sleeve, the measuring chamber has a larger orifice such that the immersion sleeve could be housed inside.

The main aspects of operation of the invention will now be described with reference in particular to FIGS. 1 to 10.

Beforehand, during a step which is not illustrated, the different components of the device 10 are manufactured. The manufacture of the components is relatively simple and may be carried out by injection molding or else by machining depending on the materials used or else according to other manufacturing methods. For example, in order to manufacture the connector body, a plastic material is molded. This molding is provided in order to form in one piece the wall of the bottom, the skirt and the nesting reliefs.

During a first assembly step, the part 60 is mounted inside the base 16 in order to obtain the assembly illustrated in FIG. 7. Beforehand, the fluid sealing gasket 32 is placed in the bottom of the cavity 22.

During the mounting of the part 60 inside the base 16, the ribs 68 provide a centering of the part 60 relative to the base 16 and its immobilization inside the cavity 22 thanks to a forced mounting. During the mounting, it is necessary to ensure that the part 60 abuts against the raised area of the bottom 24 of the cavity 22. This will allow subsequently ensuring an optimal compression of the environment gasket 80. In a simple manner, these assemblies do not require providing a specific orientation.

Then, during a second assembly step, the element 12 is positioned in the intermediate part 60 as represented in FIG. 6. Possibly thanks to the foolproof profile, the element 12 can only be positioned in a single position relative to the intermediate part 60.

Figure 10:
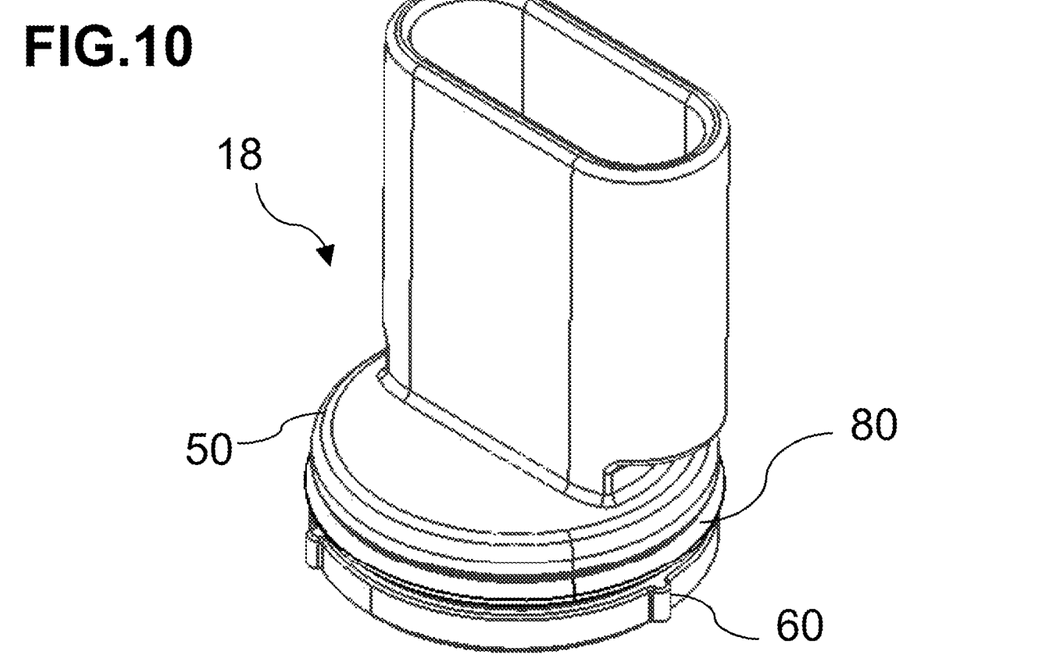
FIG. 10 represents another point of view of the case body mounted with the intermediate part already represented in FIG. 9.

During a third assembly step illustrated in FIG. 10, the environment gasket 80 may be positioned on the raised flange 64 of the intermediate part 60 already mounted in the base 16, without requiring a prior deformation of this gasket. Possibly, alternatively, the environment gasket may be positioned around the lateral skirt 56 of the connector 18 abutting against the shoulder 58.

The connector 18 and the base 16 provided with the environment gasket 80 and the intermediate part 60 are mounted together so that the part 60 cooperates by nesting with the connector 18 thanks to the nesting members 70. Alternatively, the part 60 rather than being previously mounted in the base 16 may be mounted directly with the connector 18, the assembly of the part 60 and the connector 18 being then subsequently forcibly mounted inside the base 16.

During the nesting of the connector 18 and the part 60, the environment gasket 80 is progressively compressed radially between the inner wall of the base 16 and the lateral skirt 56 of the connector 18, thus ensuring an optimal sealing of the inner housing 20 of the case body 14. Possibly, an axial compression may also occur between the flange 64 of the part 60 and the shoulder 58 of the connector 18 during the nesting.

Afterwards, a last step of crimping the end edge 27 of the base 16 on the connector 18 completes this assembly and allows obtaining the device 10 represented in FIG. 1.

This device as presented above has many advantages, in particular a great robustness, a simplicity of realization and complementary performances of electrical insulation and resistance to electrostatic discharges. The complementary specific geometries of the connector 18 and the part 60 allow ensuring foolproof of its positioning in a simple manner while participating in sealing of the device.

The invention is not limited to the previously described embodiments. In particular, a device 10 may be operated with other nesting means than those described above.

Other embodiments within the reach of those skilled in the art may also be considered without departing from the scope of the invention defined by the claims below.

The invention claimed is:

1. A device for measuring a physical parameter of a fluid of a circuit of a motor vehicle, the device comprising:
   a case body comprising a base body and a connector body for electrical coupling with an external electrical circuit, the connector body and the base body being assembled to delimit together an internal housing of the case body;
   a detection element for detecting the physical parameter, the detection element delimiting a first face for measuring the parameter and a second face for electrical connection with the connector body;
   an intermediate part for positioning the detection element within the internal housing, the intermediate part comprising a transverse space for receiving the detection element and being configured to be entirely housed inside a cavity of the base body; and
   an annular environment gasket sealing the internal housing with respect to an external environment,
   wherein the intermediate part and the connector body are shaped to cooperate by nesting in order to position the intermediate part relative to the connector body, the intermediate part and the connector body together forming an external annular groove, the external annular groove having a U-shaped cross-section that is radially and outwardly open to receive the annular environment gasket, and the external annular groove is closed by the base body such that the annular environment gasket is compressed radially inside the external annular groove,
   wherein the connector body and the intermediate part each comprise nesting members, on faces opposite the intermediate part and the connector body respectively, the nesting members of the connector body and the intermediate part having a complementary shape and being formed by a succession of protruding and recessed portions offset relative to those of the opposite face,
   wherein the connector body comprises a front wall for closing the base body and a peripheral lateral skirt extending from an inner face of the front wall by forming an internal shoulder with the front wall, the peripheral lateral skirt and the internal shoulder delimiting respectively a bottom and a lateral wall of the external annular groove, and
   wherein, in a nested position, a peripheral flange of the intermediate part has an end face which is configured to extend opposite to the internal shoulder and which delimits another lateral wall of the external annular groove.

2. The device according to claim 1, wherein the nesting members of the intermediate part are disposed around the transverse space.

3. The device according to claim 1, wherein the intermediate part is generally shaped like a plate having a main plane, and the intermediate part is provided with the peripheral flange, the peripheral flange being raised with respect to the main plane of the plate, the peripheral flange delimiting a central portion of the intermediate part inside which the transverse space extends.

4. The device according to claim 1, wherein the lateral skirt is sized so as to bear at least partially against an internal face of the peripheral flange of the intermediate part.

5. The device according to claim 1, wherein the detection element comprises a wafer-like shaped support, and the intermediate part has a central portion with a thickness that corresponds to a thickness of the wafer-like shaped support.

6. The device according to claim 1, wherein the connector body comprises an electrical coupling endpiece extending axially in protrusion.

7. The device according to claim 1, wherein the intermediate part is forcibly mounted inside the base body or is integral with the base body.

8. The device according to claim 7, wherein the intermediate part is generally shaped like a plate having a main plane, and the intermediate part is provided with a peripheral flange that is raised with respect to the main plane of the plate, and the intermediate part comprises at least one rib on a peripheral outer wall of the peripheral flange, the at least one rib capable of cooperating by friction with a lateral inner wall of the base body so that the intermediate part is forcibly mounted inside the base body.

9. The device according to claim 1, wherein the base body is provided with a peripheral lateral wall and the connector body being provided with a lateral wall on an external periphery thereof, the peripheral lateral wall of the base body retaining the connector body by crimping an end edge of the lateral wall of the connector body.

10. The device according to claim 1, wherein the detection element has a rectangular, square or cylindrical general shape.

11. The device according to claim 1, wherein the intermediate part is made of a thermoplastic material.

12. The device according to claim 1, wherein the intermediate part further comprises an axial extension in the form of an immersion sleeve to house a temperature probe.

13. The device according to claim 12, wherein the immersion sleeve extends on a border of the transverse space.

14. The device according to claim 1, further comprising at least one further fluid sealing gasket, the base body comprising a fluid measuring chamber and a bottom provided with an opening for communicating with the fluid measuring chamber, wherein the bottom of the base body is provided with a step that delimits a location for receiving the fluid sealing gasket.

* * * * *